United States Patent
Hong et al.

(10) Patent No.: US 9,710,452 B2
(45) Date of Patent: Jul. 18, 2017

(54) INPUT METHOD EDITOR HAVING A SECONDARY LANGUAGE MODE

(75) Inventors: Feng Hong, Foster City, CA (US); Wei Yang, Beijing (CN); Jeremy C. Chau, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 1416 days.

(21) Appl. No.: 12/595,225

(22) PCT Filed: Apr. 9, 2008

(86) PCT No.: PCT/US2008/059752
§ 371 (c)(1),
(2), (4) Date: Mar. 5, 2010

(87) PCT Pub. No.: WO2008/127937
PCT Pub. Date: Oct. 23, 2008

(65) Prior Publication Data
US 2010/0169770 A1    Jul. 1, 2010

Related U.S. Application Data

(60) Provisional application No. 60/911,277, filed on Apr. 11, 2007.

(30) Foreign Application Priority Data

Apr. 16, 2007  (CN) .......................... 2007 1 0101815

(51) Int. Cl.
*G06F 17/00*    (2006.01)
*G06F 17/27*    (2006.01)
(Continued)

(52) U.S. Cl.
CPC ............ *G06F 17/275* (2013.01); *G06F 17/24* (2013.01); *G06F 17/289* (2013.01); *G06F 17/2863* (2013.01)

(58) Field of Classification Search
CPC .................................. G06F 17/24; G06F 17/28
(Continued)

(56) References Cited

U.S. PATENT DOCUMENTS 4,635,199 A * 1/1987 Muraki ............................. 704/2
4,730,270 A * 3/1988 Okajima et al. .................. 704/2
(Continued)

FOREIGN PATENT DOCUMENTS

CN    1194414 A    9/1998
JP    1111263 A    4/1989
(Continued)

OTHER PUBLICATIONS

Can do it Series Editorial Department, Hiroshi Haneyama, Akihiro Yoshikawa, Seiichiro Matsumura, Chapter 3, Japanese Input, Can do it Dictionary Windows Vista first edition, Japan, Impress Japan Corporation, Yonekazu Tsuchida, Mar. 21, 2007, pp. 151 and 179.
(Continued)

*Primary Examiner* — Stephen Hong
*Assistant Examiner* — Marshon Robinson
(74) *Attorney, Agent, or Firm* — Remarck Law Group PLC

(57) ABSTRACT

Methods, systems, and apparatus, including computer program products, in which an input method editor receives a mode control input and determines a language mode based on the mode control input. Upon receiving composition inputs, the input method editor interprets the composition input based on the determined language mode.

18 Claims, 3 Drawing Sheets

(51) Int. Cl.
*G06F 17/24* (2006.01)
*G06F 17/28* (2006.01)

(58) Field of Classification Search
USPC .................................. 715/236, 261; 704/2
See application file for complete search history.

(56) References Cited

U.S. PATENT DOCUMENTS

| | | | |
|---|---|---|---|
| 6,182,099 B1* | 1/2001 | Nakasato ..................... | 715/236 |
| 7,165,019 B1* | 1/2007 | Lee et al. ..................... | 704/2 |
| 7,403,888 B1* | 7/2008 | Wang et al. ................. | 704/2 |
| 2002/0065647 A1* | 5/2002 | Hatori et al. ................ | 704/2 |
| 2004/0205671 A1* | 10/2004 | Sukehiro et al. ........... | 715/532 |
| 2006/0053001 A1 | 3/2006 | Brockett et al. | |
| 2007/0016401 A1* | 1/2007 | Ehsani et al. ............... | 704/9 |
| 2008/0208565 A1* | 8/2008 | Bisegna ....................... | 704/4 |
| 2011/0045816 A1* | 2/2011 | Wang et al. ................. | 455/420 |

FOREIGN PATENT DOCUMENTS

| | | |
|---|---|---|
| JP | 8171568 A | 7/1996 |
| JP | 10134061 A | 5/1998 |
| JP | 11003338 A | 1/1999 |
| JP | 11338858 A | 12/1999 |
| JP | 2003-196278 A | 7/2003 |
| JP | 2005-190389 A | 7/2005 |
| TW | 360850 | 6/1999 |
| TW | 501028 | 9/2002 |

OTHER PUBLICATIONS

Taiwan Search Report dated Oct. 23, 2013 for Taiwan Application No. 097113120, 1 page.
Korean Examiner Byung Il An, Notification of Transmittal of the International Search Report and the Written Opinion of the International Searching Authority, or the Declaration for Application No. PCT/US2008/059752, dated Aug. 29, 2008, 10 pages.
First Examination Report dated Mar. 8, 2016 for Indian Patent Application No. 1975/MUMNP/2009, 2 pages.

* cited by examiner

INPUT METHOD EDITOR HAVING A SECONDARY LANGUAGE MODE

This application claims the benefit of priority of U.S. Provisional Patent application No. 60/911,277, filed on Apr. 11, 2007, and China Application No. 200710101815.9, filed Apr. 16, 2007, the entire disclosures of which are incorporated herein by reference.

BACKGROUND

This disclosure relates to input methods.

Languages that use a logographic script in which one or two characters correspond roughly to one word or meaning have more characters than keys on a standard input device, such as a computer keyboard or a mobile device keypad. For example, the Chinese language contains tens of thousands of characters having pronunciations defined by base Pinyin elements and five tones. The mapping of these potentially many to one associations can be implemented by input methods that facilitate entry of characters and symbols not found on input devices. Accordingly, a Western style keyboard can be used to input Chinese characters. Likewise, input methods can be used for using a Western style keyboard or some other input device to input many other languages that include ideograms, such as the Japanese language, the Korean language, and other languages.

An input method editor can be used to realize an input method. For example, an input method editor may have two language mode modes, e.g., an English mode and a Chinese mode. Often a user of a device implementing an input method editor may desire to switch between the language mode modes, e.g., from Chinese to English or from English to Chinese.

SUMMARY

This specification describes technologies related to input method editors. In some implementations, an input method editor receives a mode control input and determines a language mode based on the mode control input. Upon receiving composition inputs, the input method editor interprets the composition input based on the determined language mode.

In some implementations, a computer program product, encoded on a tangible program carrier, is operable to cause data processing apparatus to perform operations comprising operating an input method editor in a primary language mode, the primary language mode identifying a first dictionary to be used in interpreting composition input received from a user of the input method editor; receiving a mode control input, the mode control input instructing the input method editor operate in a secondary language mode; operating the input method editor in the secondary language mode, the secondary language mode defining a second dictionary to be used in interpreting composition input received from the user of the input method editor; presenting a candidate word list, the candidate word list being based on a comparison of the composition input and the second dictionary; and receiving a word selection from the user, the word selection selecting a word from the candidate word list.

In some implementations, a system processes input method editor composition inputs in a first language mode, the first language mode defining a first language dictionary for a first language that is used to interpret the composition inputs. The system presents a first candidate word list of words in the first language. In response to a mode control input, the system processes input method editor composition inputs in a second language mode, the second language mode defining a second language dictionary for a second language that is used to interpret the composition inputs. The system present a second candidate word list of words in the second language. The system selects a word from one of the first candidate word list or the second candidate word list in response to receiving a word selection of one of the words in the first candidate word list or the second candidate word list.

In some implementations, a system includes a composition input table, a language mode input table, and an input method editor engine. The composition input table includes an association of composition inputs and characters for first and second languages. The language mode table defines a first language mode for a first language and a second language mode for a second language. The first language mode is associated with a first language dictionary associated with the first language, and the second language mode is associated with a second language dictionary associated with the second language. The input method editor engine is configured to receive a mode control input and select on of the first language mode or the second language mode in response to the mode control input, and to process composition inputs in the selected language mode and present a candidate word list of words in the language of the selected language mode, and to select a word from the candidate word list in response to receiving a word selection.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
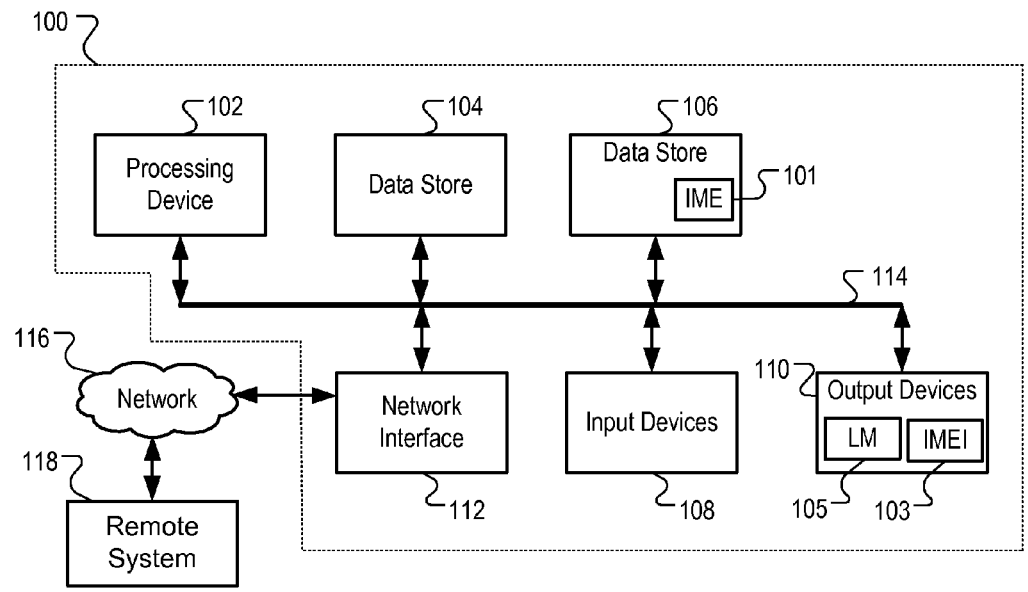
FIG. 1 is a block diagram of an example device that can be utilized to implement the systems and methods described herein.

FIG. 1 is a block diagram of an example device 100 that can be utilized to implement the systems and methods described herein. The example device 100 can, for example, be a computer device, such as a personal computer device, or other electronic devices, such as a mobile phone, mobile communication device, personal digital assistant (PDA), and the like.

The example device 100 includes a processing device 102, a first data store 104, a second data store 106, input devices 108, output devices 110, and a network interface 112. A bus system 114, including, for example, a data bus and a motherboard, can be used to establish and control data communication between the components 102, 104, 106, 108, 110 and 112. Other system architectures can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

Example input devices 108 can include a keyboard, a mouse, a stylus, etc., and example output devices 110 can include a display device, an audio device, etc. The network interface 112 can, for example, include a wired or wireless network device operable to communicate data to and from a network 116. The network 116 can include one or more local area networks (LANs) and/or a wide area network (WAN), such as the Internet.

In some implementations, the device 100 can include input method editor (IME) code 101 from a data store, such as the data store 106. The input method editor code 101 can include instructions that upon execution cause the processing device 102 to carry out input method editing functions. The input method editor code 101 can, for example, comprise interpreted instructions, such as script instructions, e.g., JavaScript or ECMAScript instructions, that can be executed in a web browser environment. Other implementations can also be used, e.g., a stand-alone application, an applet, a plug-in module, etc.

Execution of the input method editor code 101 generates or launches an input method editor instance 103. The input method editor instance 103 facilitates the processing of one or more input methods at the device 100, during which time the device 100 can receive composition inputs for input characters or symbols, such as, for example, Hanzi characters. For example, the user can use one or more of the input devices 108 (e.g., a keyboard, such as a Western-style keyboard, a stylus used with a handwriting recognition engine, etc.) to input composition inputs for identification of Hanzi characters. In some examples, a Hanzi character can be composed of more than one composition input.

The first data store 104 and/or the second data store 106 can store an association of composition inputs and characters. Based on a user input, the input method editor instance 103 can use information in the data store 104 and/or the data store 106 to identify one or more candidate selections (e.g., candidate words) represented by the input. In some implementations, if more than one candidate selection is identified, the candidate selections are displayed on an output device 110. Using the input device 108, the user can select from the candidate selections a Hanzi character that the user desires to input.

In some implementations, the input method editor instance 103 on the device 100 can receive one or more Pinyin composition inputs and convert the composition inputs into Hanzi characters. The input method editor instance 103 can, for example, use compositions of Pinyin syllables or characters received from keystrokes to represent the Hanzi characters. Each Pinyin syllable can, for example, correspond to one or more keystrokes in the Western-style keyboard. Using a Pinyin input method editor, a user can input a Hanzi character by using composition inputs that includes one or more Pinyin syllables representing the sound of the Hanzi character. Input methods for other languages, however, can also be facilitated.

In some implementations, a remote computing system 118 having access to the system 100 can also be used to edit a logographic script. For example, the system 100 may be a server that provides logographic script editing capability via the network 116. In one example, a user can edit a logographic script stored in the data store 104 and/or the data store 106 using a remote computing system, e.g., a client computer. The system 100 can, for example, select a character and receive a composition input from a user over the network interface 112. The processing device 102 can, for example, identify one or more characters adjacent to the selected character, and identify one or more candidate selections based on the received composition input and the adjacent characters. The system 100 can transmit a data communication that includes the candidate selections back to the remote computing system.

Figure 2:
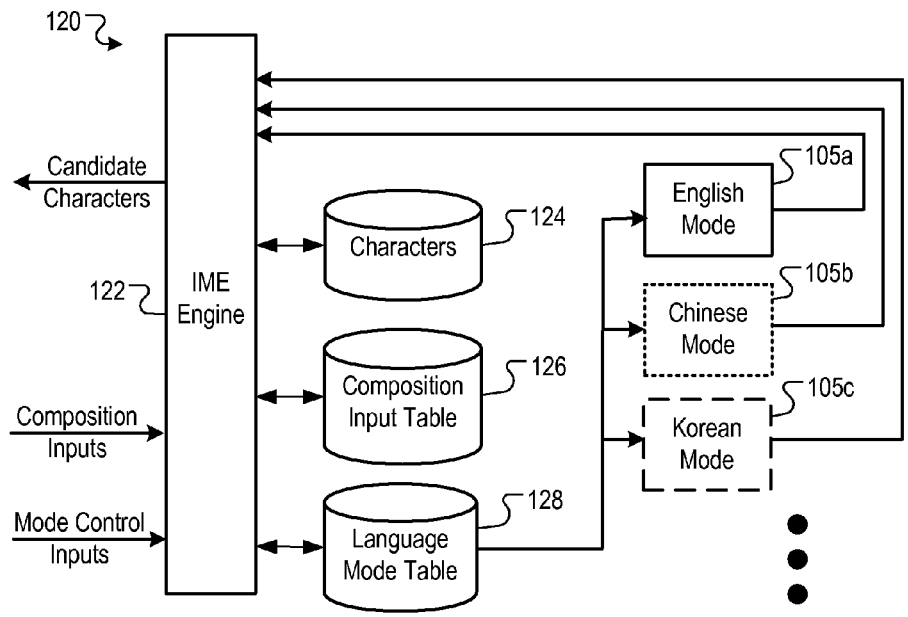
FIG. 2 is a block diagram of an example input method editor system.

FIG. 2 is a block diagram of an example input method editor system 120. The input method editor system 120 can, for example, be implemented using the input method editor code 101 and associated data stores 104 and 106. The input method editor system 120 includes an input method editor (IME) engine 122, a character data store 124, a composition input table 126, and a language mode table 128. Other storage architectures can also be used. The character data store 124 can include characters of a logographic script used in one or more language models, and characters and words in Roman-based or western-style alphabets, e.g., English, German, Spanish, etc. In some implementations, the character data store 124 also includes information about relationships between characters and/or words. For example, the character data store 124 can include scores or probability values assigned to a character or word depending on characters or words adjacent to the character. Other contextual relation data can also be used.

The composition input table 126 includes an association of composition inputs and the characters/words stored in the character data store 124. In some implementations, the composition input table 126 can link each of the characters/words in the character data store 124 to a composition input used by the input method editor engine 122. For example, the input method editor engine 122 can use the information in the character data store 124 and the composition input data store 124 to associate and/or identify one or more characters or words in the character data store 124 with one or more composition inputs in the composition input table 126.

The language mode table 128 can define one or more language modes, e.g., an English language mode, a Chinese language mode, etc. and switch between modes based upon mode control inputs received from a user. Each language mode can, for example, define, e.g., be associated with, a particular dictionary associated with the language of the selected language mode. In some implementations, the language modes can also include a user history of a particular user, e.g., a dictionary of words and phrases often used by a particular user.

In some implementations, the input method editor instance (IMEI) 103 can identify candidate selections based on one or more composition inputs and language modes (LM) 105. The language modes 105 can, for example, define different languages supported by the input method editor instance 103, e.g., an English language mode 105a, a Chinese language mode 105b, a Korean language mode 105c, etc. For example, the input method editor instance 103 can apply the English language mode 105a to composition inputs to map the composition inputs to the English alphabet. Likewise, the input method editor instance 103 can apply the Chinese language mode 105b to composition inputs to map the composition inputs, for example, to Pinyin inputs, etc. In some implementations, one of the language modes can comprise a primary language mode in which a document or other text is written. Another of the language modes can comprise a secondary language mode, which can be used to enter words in another language if the user is unfamiliar with a word or composition input for the word in a primary language (e.g., a native language).

In some implementations, the input method editor engine 122 can receive a mode control input, and interpret the composition inputs according to a language mode 105 (e.g., an English mode 105a, a Chinese mode 105b, a Korean mode 105c, etc) identified by the mode control input. Based on the language mode and the composition inputs, candidate selections can be identified and presented to a user for selection. Candidate selections can be identified, for example based on interpreting the composition inputs in the selected language mode, and comparing the interpreted composition inputs with words or characters that match the interpreted composition inputs.

For example, in some implementations, an English mode can be entered by keying a mode control input. The mode control input can be a key or sequence of keys, which when entered cause an input method editor to switch language modes based on the mode control input. Candidate selections can be determined, for example, by comparing the composition inputs to prefixes of English words and setting the English context value based on the comparison. For example, the composition inputs e-l-e-c match the character strings in the word "elect," "electricity," "electronic," etc. In some implementations, the candidate selections can be weighted based on context, usage statistics (e.g., based on a user profile or on global usage of the candidate selections). Other weightings are possible. The candidate selections can be reordered based on the weightings associated with each of the selections.

The input method editor engine 122 can receive a selection of a word from among the candidate selections. The word can be selected, for example, by a user based on the word that most closely matches the word the user intended to insert into the text (e.g., document). In some examples, words in one language (e.g., English) may have no equivalents in the another language (e.g., Chinese). As such, these words can be inserted into text in English in some implementations. In other examples, a logographic lexicon may be so voluminous that a user may not know the word or the correct Pinyin characters to produce the word. In such examples, some implementations can enable the user to enter the word into the input method editor engine 122 using a secondary language mode. In such implementations, when a word is entered using a secondary language mode, the input method editor engine 122 can translate the word from the secondary language to the primary language. In other implementations, the input method editor engine 122 can include the word in the secondary language within the text of the primary language. In other implementations, after the word is entered in the secondary language mode, the input method editor engine 122 reverts back to the primary language mode.

Figure 3:
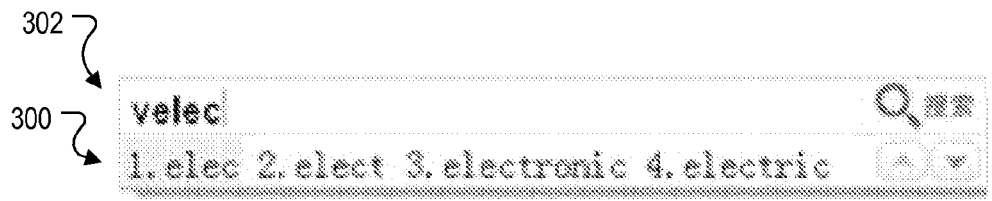
FIG. 3 illustrates an example set of candidate selections based on language mode values and composition inputs.

FIG. 3 illustrates an example set of candidate selections 300 (e.g., candidate words) based on first composition inputs 302 and language mode values. In this implementation, the mode control input, "v," indicates to an input method editor, e.g., the input method editor instance 103, that the remaining composition inputs should be interpreted according to a secondary language mode (e.g., an English language mode).

The composition inputs e-l-e-c can be received by an input method editor, e.g., the input method editor instance 103, and can be interpreted according to an English language mode, e.g., English language mode 105a. The candidate selections 302, numbered 1-4 can, for example, define English words having the highest probability of matching the English word intended by the user, and thus are displayed as shown.

In some implementations, the candidate selections 302 can include the identity of the letters typed by the user in order to capture user-defined words that may not be included in the dictionary (e.g., abbreviations, proper names, fanciful words, etc.). As an example of such instances, the first candidate selection of FIG. 3 is labeled "1. elec." While these letters may not be a word in the dictionary corresponding to the selected language mode, the letters may still be displayed as the user might not intend to use a word, i.e., the user may intend to use the letters "elec." Therefore, one selection can correspond to the exact letters entered by the user. In other implementations, the candidate selections 302 can comprise only words matching entries in a dictionary. In such implementations, users can enter user-defined words in their entirety and press a key (e.g., a space bar) to move to the next word.

Figure 4:
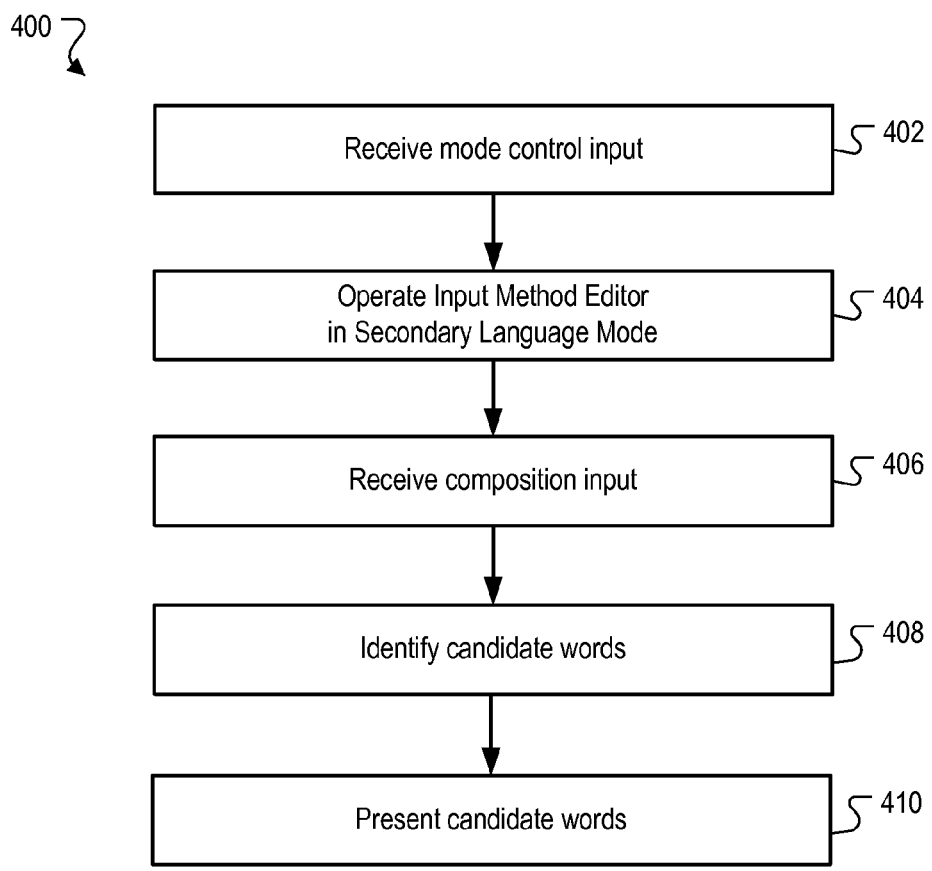
FIG. 4 is a flow diagram of an example input method process having a secondary language mode.

FIG. 4 is a flow diagram of an example input method process 400 having a secondary language mode. The process 400 can be implemented, for example, in the device 100 of FIG. 1 and/or in the input method editor system 120 of FIG. 2.

The process 400 receives mode control inputs (402). For example, the device 100 of FIG. 1 implementing an input method editor, and/or the input method editor system 120 of FIG. 2 can receive mode control inputs (e.g., keyboard inputs from a keyboard). The mode control inputs can be mapped to a corresponding language mode, such as, for example, the English language mode 105a of FIG. 2.

The process 400 operates an input method editor in a secondary language mode (404). For example, the device 100 of FIG. 1 implementing an input method editor, and/or the input method editor system 120 of FIG. 2 can change the language mode to a secondary language mode (e.g., an English language mode 105a of FIG. 2) in response to the mode control input. The secondary language mode, in some implementations, can cause the input method editor to interpret composition input (e.g., keyboard inputs from a keyboard) in accordance with, for example, a secondary dictionary associated with the secondary language mode.

The process 400 receives composition inputs (406). For example, the device 100 of FIG. 1 implementing an input method editor, and/or the input method editor system 120 of FIG. 2 can receive composition inputs (e.g., keyboard inputs from a keyboard). The keyboard inputs can be mapped to entries in a dictionary (e.g., character data store 124) according to the language mode. The mapping can be performed using, for example using a composition input table (e.g., composition input table 126 of FIG. 2).

The process 400 identifies candidate words (408). For example, the device 100 of FIG. 1 implementing an input method editor and/or the input method editor system 120 of FIG. 2 can identify candidate words (e.g., candidate selections 300 of FIG. 3) based on the composition input mapping to the dictionary (e.g., character data store 124 of FIG. 2).

The process 400 can present candidate selections (410). For example, the device 100 of FIG. 1 implementing an input method editor and/or the input method editor system 120 of FIG. 2 can present candidate words (e.g., candidate selections 300 of FIG. 3) based the identification of the candidate words using a composition input table (e.g., composition input table 126 of FIG. 2) and a character data store (e.g., character data store 124 of FIG. 2). The presentation of the candidate words can encourage a user of the input method editor to select one of the candidate words for insertion into the text which is being edited by the input method editor.

Figure 5:
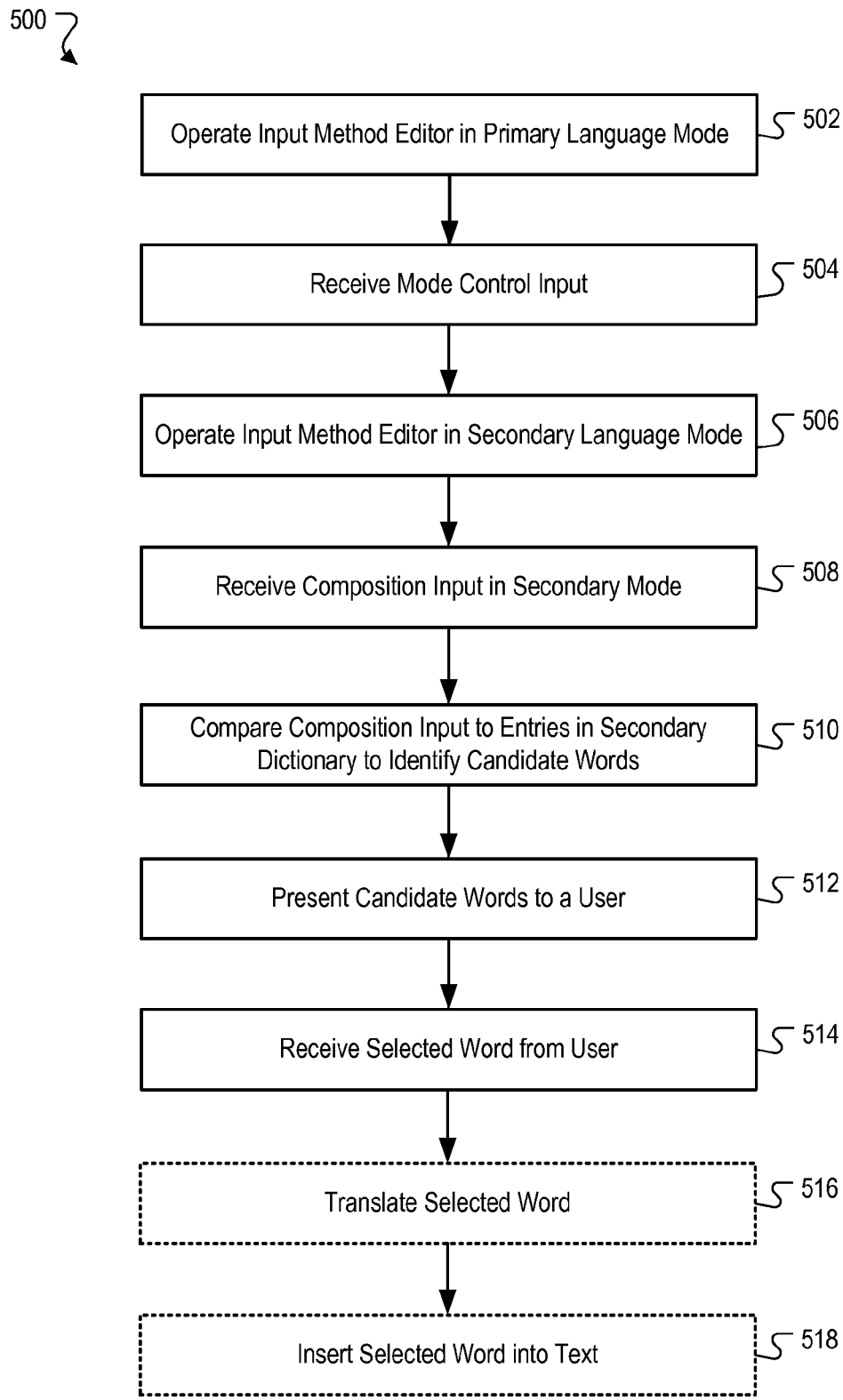
FIG. 5 is a flow diagram of another example input method process having a secondary language mode.

FIG. 5 is a flow diagram of an example input method process 500 having a secondary language mode. The process 500 can be implemented, for example, in the device 100 of FIG. 1 and/or in the input method editor system 120 of FIG. 2.

The process 500 operates an input method editor in a primary language mode (502). For example, the device 100 of FIG. 1 implementing an input method editor, and/or the input method editor system 120 of FIG. 2 can operate the input method editor using a secondary language mode (e.g., a Chinese language mode 105*b* of FIG. 2). The primary language mode, in some implementations, can cause the input method editor to interpret composition input (e.g., keyboard inputs from a keyboard) in accordance with, for example, a primary dictionary associated with the primary language mode.

The process 500 receives mode control inputs (504). For example, the device 100 of FIG. 1 implementing an input method editor, and/or the input method editor system 120 of FIG. 2 can receive mode control inputs (e.g., keyboard inputs from a keyboard). The mode control inputs can be mapped to a corresponding language mode, such as, for example, the English language mode 105*a* of FIG. 2.

The process 500 operates an input method editor in a secondary language mode (506). For example, the device 100 of FIG. 1 implementing an input method editor, and/or the input method editor system 120 of FIG. 2 can change the language mode to a secondary language mode (e.g., an English language mode 105*a* of FIG. 2) in response to the mode control input. The secondary language mode, in some implementations, can cause the input method editor to interpret composition input (e.g., keyboard inputs from a keyboard) in accordance with, for example, a secondary dictionary associated with the secondary language mode.

The process 500 receives composition inputs (508). For example, the device 100 of FIG. 1 implementing an input method editor, and/or the input method editor system 120 of FIG. 2 can receive composition inputs (e.g., keyboard inputs from a keyboard). The keyboard inputs can be mapped to entries in a dictionary (e.g., character data store 124) according to the language mode. The mapping can be performed using, for example using a composition input table (e.g., composition input table 126 of FIG. 2).

The process 500 compares composition inputs to entries in a secondary dictionary to identify candidate words (510). For example, the device 100 of FIG. 1 implementing an input method editor and/or the input method editor system 120 of FIG. 2 can identify candidate words (e.g., candidate selections 300 of FIG. 3) based on the composition input mapping to the dictionary (e.g., character data store 124 of FIG. 2). The mapping can be performed, for example, using a composition input table (e.g., composition input table 126 of FIG. 2).

The process 500 can present candidate words to a user (512). For example, the device 100 of FIG. 1 implementing an input method editor and/or the input method editor system 120 of FIG. 2 can present candidate words (e.g., candidate selections 300 of FIG. 3) based on the identification of the candidate words using a composition input table (e.g., composition input table 126 of FIG. 2) and a character data store (e.g., character data store 124 of FIG. 2). The presentation of the candidate words can encourage a user of the input method editor to select one of the candidate words for insertion into the text which is being edited by the input method editor.

The process 500 can receive a selected word from a user (514). For example, the device 100 of FIG. 1 implementing an input method editor and/or the input method editor system 120 of FIG. 2 can receive the selected word based on the presented candidate words (e.g., any of candidate selections 300 of FIG. 3). The receipt of a selected word can cause the input method editor to insert the selected word into a text.

In some implementations, the process 500 can translate the selected word (516). For example, the device 100 of FIG. 1 implementing an input method editor and/or the input method editor system 120 of FIG. 2 can translate the selected word. The translated word can be translated from a secondary language associated with the secondary language mode to a primary language associated with the primary language mode.

In some implementations, the process 500 can insert the selected word into a piece of text (518). For example, the device 100 of FIG. 1 implementing an input method editor and/or the input method editor system 120 of FIG. 2 can insert selected word into a piece of text (e.g., a piece of text selected for editing by the input method editor). In some implementations, the selected word is inserted into the text in a primary language (e.g., after translation). In other implementations, the selected word is inserted into the text in a secondary language associated with a secondary language mode.

Although described in the context of particular language and input method examples, the systems and methods described herein can be used for any language that utilizes a logographic script. For example, the systems and methods described herein can be used for many other languages that include ideograms, such as the Japanese language, the Korean language, and other languages.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
    operating an input method editor in a primary language mode, the primary language mode defining a primary dictionary to be used by the input method editor;
    receiving a mode control input that is operable to instruct the input method editor to use a secondary language mode;
    operating the input method editor in the secondary language mode based on receiving the mode control input, the secondary language mode defining a secondary dictionary to be used by the input method editor;
    receiving composition input at the input method editor operating in the secondary language mode, the composition input comprising one or more keystrokes from a keyboard input device;
    comparing in the secondary language mode the composition input to entries in the secondary dictionary;
    identifying in the secondary language mode candidate words based on the comparison;
    presenting in the secondary language mode the candidate words to a user of the input method editor;
    receiving in the secondary language mode a word selection from the user, the word selection selecting a word from among the candidate words;
    automatically reverting back to the primary language mode upon receiving the word selection from the user in the secondary language mode and before receiving additional composition input; and
    inserting the selected word within a text being edited by the input method editor, wherein the text being edited by the input method editor is text that was generated in the primary language mode.

2. The method of claim 1, wherein the primary language mode comprises a Chinese mode and the secondary language mode comprises an English mode.

3. The method of claim 1, wherein the mode control input comprises an input sequence of two or more keystrokes.

4. The method of claim 2, further comprising:
    comparing the composition input to prefixes of English words; and
    identifying English words based on the comparison, the English words comprising the candidate words.

5. The method of claim 1, further comprising:
    translating the selected word to a language associated with the primary language mode prior to inserting the selected word into the text.

6. The method of claim 1, wherein the input method editor is responsive to a plurality of mode control inputs, each of the plurality of mode control inputs associated with a different secondary language mode.

7. The method of claim 1, further comprising:
    receiving composition input in the primary language mode; and
    interpreting the composition input in the primary language mode based on a primary dictionary, and wherein the primary dictionary comprises a logographic dictionary.

8. A computer program product, encoded on a tangible program carrier, operable to cause data processing apparatus to perform operations comprising:
    operating an input method editor in a primary language mode, the primary language mode identifying a first dictionary to be used in interpreting composition input received from a user of the input method editor;
    receiving a mode control input that instructs the input method editor operate in a secondary language mode;
    operating the input method editor in the secondary language mode, the secondary language mode defining a second dictionary to be used in interpreting composition input received from the user of the input method editor;
    presenting a candidate word list in the secondary language mode, the candidate word list being based on a comparison of the composition input and the second dictionary;
    receiving a word selection from the user, the word selection selecting a word from the candidate word list;
    automatically reverting back to the primary language mode upon receiving the word selection from the user in the secondary language mode and before receiving additional composition input; and
    inserting the selected word within a text being edited by the input method editor, wherein the text being edited by the input method editor is text that was generated in the primary language mode.

9. The computer program product of claim 8, wherein operating in a secondary language mode comprises:
    comparing the composition input to entries in the second dictionary; and
    identifying a candidate word based on the comparison.

10. A system comprising one or more processors and one or more memory devices storing one or more computer programs operable to cause the one or more processors to perform operations comprising:
    processing input method editor composition inputs in a first language mode, the first language mode defining a first language dictionary for a first language that is used to interpret the composition inputs, and present a first candidate word list of words in the first language;
    in response to processing a mode control input, processing subsequent input method editor composition inputs in a second language mode, the second language mode defining a second language dictionary for a second language that is used to interpret the composition inputs, and present a second candidate word list of words in the second language;
    selecting a word from one of the first candidate word list or the second candidate word list in response to receiving a word selection of one of the words in the first candidate word list or the second candidate word list;
    automatically reverting back to the first language mode upon receiving the word selection in the second language mode and before receiving additional composition input; and
    inserting the selected word within a text being edited by the input method editor, wherein the text being edited by the input method editor is text that was generated in the primary language mode.

11. The system of claim 10, wherein the first language mode is a Chinese mode and the second language mode is an English mode, and wherein the one or more computer programs are further operable to cause the one or more processors to perform operations comprising:
    comparing the composition inputs to prefixes of English words when processing input method editor composition inputs in the second language mode; and
    identifying English words based on the comparison.

12. The system of claim 10, wherein the first language mode is a Chinese mode and the second language mode is an English mode, and wherein the one or more computer programs are further operable to cause the one or more processors to perform operations comprising translating a selected English word to a Chinese word when the selected word is selected from the second candidate word list.

13. A system, comprising:
- a composition input table that includes an association of composition inputs and characters for first and second languages;
- a language mode table that defines a first language mode for a first language and a second language mode for a second language, the first language mode associated with a first language dictionary associated with the first language, and the second language mode associated with a second language dictionary associated with the second language; and
- an input method editor engine configured to receive a mode control input and select one of the first language mode or the second language mode in response to the mode control input, to process composition inputs in the selected language mode and present a candidate word list of words in the language of the selected language mode, to select a word from the candidate word list in response to receiving a word selection, and to automatically revert to the first language mode upon receiving the word selection in the second language mode and before receiving additional composition input,
- wherein the input method editor engine is further configured to insert the selected word within a text being edited that was generated in the primary language mode.

14. The system of claim 13, wherein the first language mode is a Chinese mode and the second language mode is an English mode, and wherein the input method editor engine is further configured to translate the selected word from English to Chinese when the selected word is selected from a candidate word list of words in the English language.

15. The computer program product of claim 8, wherein the operations further comprise translating the selected word to a language associated with the primary language mode prior to inserting the selected word into the text.

16. The system of claim 10, wherein the operations further comprise translating the selected word to a language associated with the primary language mode prior to inserting the selected word into the text.

17. The system 13, wherein the input method editor engine is further configured to translate the selected word to a language associated with the primary language mode prior to inserting the selected word into the text.

18. A computer-implemented method, comprising:
- initiating, at a computing device having one or more processors, an input method editor (IME) having a primary language mode and a secondary language mode associated with primary and secondary languages, respectively;
- receiving, at the computing device from a user, a primary language text in the primary language via the IME in the primary language mode; and
- editing, at the computing device by the user, the primary language text via the IME, the editing comprising:
  (i) in response to a mode control input from the user, transitioning the IME from the primary language mode to the secondary language mode;
  (ii) receiving a secondary language text in the secondary language via the IME in the secondary language mode;
  (iii) obtaining and outputting candidate secondary language words via the IME in the secondary language mode, each candidate secondary language word representing a potential secondary language word corresponding to the secondary language text;
  (iv) receiving a selection by the user of one of the candidate secondary language words to obtain a selected secondary language word; and
  (v) inserting the selected secondary language word into the primary language text,
- wherein the editing further comprises:
  - obtaining a translation of the selected secondary language word from the secondary language to the primary language to obtain a translated primary language word; and
  - inserting the translated primary language word into the primary language text.

* * * * *